United States Patent
Hess et al.

(10) Patent No.: US 10,633,975 B2
(45) Date of Patent: Apr. 28, 2020

(54) DEVICE FOR PRODUCING, REPAIRING AND/OR REPLACING A COMPONENT BY MEANS OF A POWDER THAT CAN BE SOLIDIFIED BY ENERGY RADIATION, METHOD AND COMPONENT PRODUCED ACCORDING TO SAID METHOD

(75) Inventors: Thomas Hess, Munich (DE); Erwin Bayer, Dachau (DE); Markus Waltemathe, Hannover (DE); Klaus Broichhausen, Groebenzell (DE); Wilhelm Satzger, Munich (DE); Siegfried Sikorski, Munich (DE); Karl-Heinz Dusel, Unterschleissheim (DE); Hans-Christian Melzer, Jetzendorf (DE)

(73) Assignee: MTU AERO ENGINES AG, Munich (DE)

( * ) Notice: Subject to any disclaimer, the term of this patent is extended or adjusted under 35 U.S.C. 154(b) by 2009 days.

(21) Appl. No.: 13/822,713

(22) PCT Filed: Sep. 12, 2011

(86) PCT No.: PCT/DE2011/001729
§ 371 (c)(1),
(2), (4) Date: Sep. 24, 2013

(87) PCT Pub. No.: WO2012/051979
PCT Pub. Date: Apr. 26, 2012

(65) Prior Publication Data
US 2014/0065343 A1    Mar. 6, 2014

(30) Foreign Application Priority Data
Oct. 20, 2010   (DE) .......................... 10 2010 049 068

(51) Int. Cl.
*F01D 5/14* (2006.01)
*B29D 99/00* (2010.01)
(Continued)

(52) U.S. Cl.
CPC ............ *F01D 5/141* (2013.01); *B22F 3/1055* (2013.01); *B29C 64/153* (2017.08); *B29C 73/00* (2013.01);
(Continued)

(58) Field of Classification Search
CPC ..... F01D 5/141; B29D 99/0025; B29C 73/34; B29C 73/00; B29C 67/0077;
(Continued)

(56) References Cited

U.S. PATENT DOCUMENTS 3,342,415 A * 9/1967 Point ................... B05B 3/1057
                                                    118/626
3,486,484 A * 12/1969 Bullough ................ B05B 5/057
                                                    118/308
(Continued)

FOREIGN PATENT DOCUMENTS

DE              19851224 C1     5/2000
DE        102004022386 A1      11/2005
(Continued)

*Primary Examiner* — Nahida Sultana
(74) *Attorney, Agent, or Firm* — Abel Schillinger, LLP

(57) ABSTRACT

The invention relates to a device for producing, repairing and/or replacing a component, particularly an aircraft component, by means of a powder that can be solidified by energy radiation of an energy radiation source, characterized in that the device comprises an application unit that is designed such that the powder can be applied onto an uneven surface by means of the application unit.

20 Claims, 3 Drawing Sheets

(51) Int. Cl.
   *B29C 73/00* (2006.01)
   *B22F 3/105* (2006.01)
   *B29C 73/34* (2006.01)
   *B29C 64/153* (2017.01)
   *B33Y 80/00* (2015.01)
   *B29C 35/08* (2006.01)

(52) U.S. Cl.
   CPC .......... *B29C 73/34* (2013.01); *B29D 99/0025* (2013.01); *B22F 2003/1056* (2013.01); *B29C 2035/0838* (2013.01); *B33Y 80/00* (2014.12); *Y02P 10/295* (2015.11); *Y10T 428/20* (2015.01)

(58) Field of Classification Search
   CPC ......... B29C 2035/0838; B29C 99/0025; B22F 3/1055; B22F 2003/1056; Y02P 10/295; Y10T 428/20; Y10S 118/14; Y10S 118/15; B05C 1/0808; B05C 1/0817
   USPC ..... 264/113, 308, 497, 492; 425/375, 174.4, 425/174.8 R; 118/110, 120, DIG. 14, 118/DIG. 15
   See application file for complete search history.

(56) References Cited

U.S. PATENT DOCUMENTS

| | | | | |
|---|---|---|---|---|
| 3,884,623 | A * | 5/1975 | Slack | G03G 15/2053 100/176 |
| 4,103,406 | A * | 8/1978 | Ito | B21B 27/02 492/1 |
| 4,585,395 | A * | 4/1986 | Nourse et al. | F01D 5/141 416/227 R |
| 4,798,074 | A * | 1/1989 | Feldmann | B21B 13/142 492/1 |
| 4,800,742 | A * | 1/1989 | Feldmann | B21B 13/142 492/1 |
| 5,107,790 | A * | 4/1992 | Sliker | B41F 23/08 118/212 |
| 5,429,046 | A * | 7/1995 | Shiba | A41F 7/26 101/148 |
| 5,450,181 | A * | 9/1995 | Tsukida | G03G 15/2053 219/216 |
| 5,693,404 | A * | 12/1997 | Shiraishi | B05C 1/027 428/156 |
| 5,728,252 | A * | 3/1998 | Kniazzeh | B32B 37/0053 100/176 |
| 5,807,460 | A * | 9/1998 | Yamamoto | B29B 17/04 118/101 |
| 6,665,512 | B1 * | 12/2003 | Yanagida | G03G 15/1685 399/308 |
| 6,764,636 | B1 * | 7/2004 | Allanic | B29C 41/12 118/100 |
| 7,047,098 | B2 | 5/2006 | Lindemann et al. | |
| 7,669,547 | B2 * | 3/2010 | Jacobson | B05C 1/02 118/203 |
| 7,927,669 | B2 * | 4/2011 | Schlatterbeck | B05L 312/04 427/162 |
| 8,070,474 | B2 * | 12/2011 | Abe | B29C 67/0077 118/256 |
| 8,969,625 | B1 * | 3/2015 | Pupek | C07F 9/12 568/17 |
| 2001/0045678 | A1 * | 11/2001 | Kubo | B29C 41/36 264/37.29 |
| 2001/0050448 | A1 * | 12/2001 | Kubo | B29C 67/0077 264/308 |
| 2002/0105114 | A1 * | 8/2002 | Kubo | B29C 67/0077 264/497 |
| 2002/0152002 | A1 | 10/2002 | Lindemann et al. | |
| 2002/0195746 | A1 * | 12/2002 | Hull | B29C 67/0062 264/401 |
| 2002/0195747 | A1 * | 12/2002 | Hull | B29C 41/12 264/401 |
| 2006/0045981 | A1 * | 3/2006 | Tsushi | B05C 1/10 427/428.01 |
| 2006/0189465 | A1 * | 8/2006 | Brown | H01L 21/67057 492/27 |
| 2007/0074659 | A1 * | 4/2007 | Wahlstrom | B29C 67/0066 118/679 |
| 2009/0206522 | A1 * | 8/2009 | Hein | B22F 3/1055 264/497 |
| 2009/0255912 | A1 * | 10/2009 | Dietrich | B29C 67/0085 219/121.86 |
| 2009/0312166 | A1 * | 12/2009 | Ichikawa | H01B 13/345 492/27 |
| 2011/0287185 | A1 | 11/2011 | Felstead et al. | |
| 2013/0224034 | A1 * | 8/2013 | Sakamoto et al. | F01D 5/141 416/227 R |
| 2015/0267541 | A1 * | 9/2015 | Hui | F01D 5/141 416/227 R |
| 2015/0308276 | A1 * | 10/2015 | Kleinow | F01D 5/20 416/228 |

FOREIGN PATENT DOCUMENTS

| | | |
|---|---|---|
| DE | 102005025199 A1 | 12/2006 |
| DE | 202007016591 U1 | 2/2008 |
| EP | 1234625 A1 | 8/2002 |
| EP | 2399695 A1 | 12/2011 |
| GB | 2452476 A | 3/2009 |
| WO | 2010061174 A2 | 6/2010 |

\* cited by examiner

DEVICE FOR PRODUCING, REPAIRING AND/OR REPLACING A COMPONENT BY MEANS OF A POWDER THAT CAN BE SOLIDIFIED BY ENERGY RADIATION, METHOD AND COMPONENT PRODUCED ACCORDING TO SAID METHOD

BACKGROUND OF THE INVENTION

1. Field of the Invention

The present invention relates to a device for producing or forming, repairing and/or replacing a component by means of at least one powder that can be solidified by energy radiation. In this case, the component is for example an aircraft component, for example a vane element of an aircraft engine, for example of a turbojet engine. In principle, however, the device and the method may also be used for any other component which can be produced or processed by means of a powder that can be solidified by energy radiation. In order to be solidified, the powder is in this case sintered or melted by the energy radiation.

2. Discussion of Background Information

Current powder bed-based generative manufacturing methods are only capable of operating horizontally.

For instance, from the prior art as disclosed in DE 10 2005 025 199 A1, a device in which a body is constructed layer-wise from powder is known. For this purpose, the powder is solidified by means of a laser beam. In this case, an annular blade is used for the layer-wise application of the powder onto a support. In the annular blade as particle transport device, there is a rotatably mounted roller as a compression unit for the powder particles.

Furthermore, a device for producing microbodies is known from DE 10 2004 022 386 A1. An annular blade, which can be moved over a plurality of construction areas for the production of microbodies, is used in this case. The annular blade in this case executes a circular movement about a rotation axis, the construction areas being arranged in the movement path.

In addition, DE 20 2007 016 591 U1 discloses a blading device having a blade which is closed on itself. The blade is in this case guided straight with respect to the construction area of the body to be produced. For this purpose, a straight guide, which is connected to the blade, is provided in order to move the annular blade over a construction area for the body to be produced. Furthermore, the straight guide is arranged on a support, the support being capable of carrying out a rotational movement.

In said documents of the prior art, the powder to be solidified is applied on a horizontal platform, i.e. horizontally processed. Therefore, components can only be produced in a plane.

SUMMARY OF THE INVENTION

It is now an object of the invention to provide an improved device and an improved method for producing or forming, repairing and/or replacing a component by means of a powder to be solidified by energy radiation.

According to the invention, a device and a method for forming, repairing and/or replacing a component are now provided.

More precisely, a device is provided for producing, repairing and/or replacing a component, in particular an aircraft component, by means of a powder that can be solidified by energy radiation from an energy radiation source, the device having an application unit which is configured so that the powder can be applied onto a non-planar surface by means of the application unit.

The device has the advantage that components having more complex surfaces can be structured very simply in this way, which allows greater flexibility particularly for repairs or the replacement of components.

A method for producing, repairing and/or replacing a component is furthermore provided, the method having the following steps:

providing an energy radiation source for solidifying a powder that can be solidified by means of the energy radiation source;

providing a non-planar surface on which the powder to be solidified is to be applied;

providing an application unit which is configured for applying the powder to be solidified onto the non-planar surface;

applying the powder to be solidified onto the non-planar surface by means of the application unit; and solidifying the powder in the regions of the component by means of the energy radiation source.

The method likewise has the advantage that components having complex surfaces can be constructed, which is advantageous particularly for repairs and components having component regions made of different materials.

Advantageous configurations and refinements of the invention may be found in the dependent claims and the description with reference to the drawings.

BRIEF DESCRIPTION OF THE DRAWINGS

The invention will be explained in more detail below with the aid of the exemplary embodiments shown in the schematic figures of the drawings, in which.

In the Figures, elements which are the same or similar are provided with the same reference signs unless stated to the contrary.

DETAILED DESCRIPTION OF THE INVENTION

Figure 1:
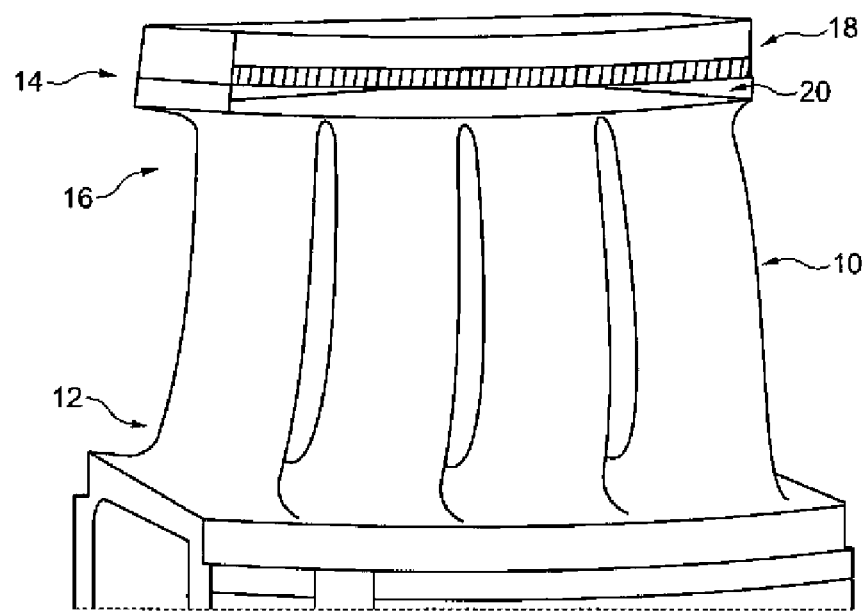
FIG. 1 shows a perspective view of a component, which has a layered structure.

FIG. 1 represents a perspective view of a component 10, here for example a vane segment of an engine, for example an aircraft engine. The vane segment 10 in the example shown has a vane element 12 and honeycomb seals 14, the vane element 12 and the honeycomb seals 14 consisting of different materials in the present example. Therefore, a first component region 16, here the vane element 12, is first constructed from the first material and the second component region 18, here the honeycomb seals 14, is subsequently constructed from the second material.

Figure 2:
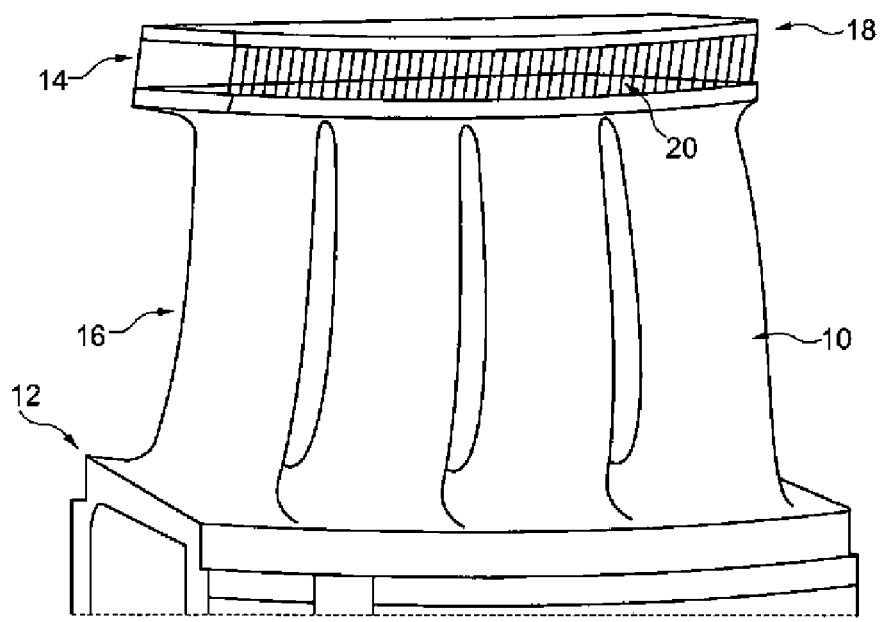
FIG. 2 shows a perspective view of a variant of the component according to FIG. 1 having an alternative layered structure.

With the previous blades or scrapers, as are known from the prior art, however, this is not optimally possible. For this purpose, previously, as shown in FIGS. 1 and 2, the first component region 16, here the vane element 12, is first essentially constructed and the second component region 18, here the honeycomb seals 14, is subsequently constructed on a straight or planar surface 20 of the first component region 16, or of the vane element 12. The problem which arises in this case is that the vane element 12 does not form a planar surface at its end, but actually has a curved surface, since the completed vane segment 12 is subsequently assembled with other vane segments to form a ring.

In the example of the component 10 as shown in FIG. 1, the actual end of the vane element 12 is constructed only to the extent to which a planar surface 20 is possible. Subsequently, the rest of the end of the vane element 12 and the second component region 18, here the honeycomb seals 14, are constructed on the planar surface 20. For the honeycomb seals 18, a different material is in this case used than for the vane element 12. Yet because the end of the first component region 16, or of the vane element 12, still needs to be completed, the same material as for the honeycomb seals 14 must be used for the rest of the end of the vane element 12.

FIG. 2 shows an example of an alternative structure of the component 10, here the vane segment. In the example shown in FIG. 2, in contrast to the example of FIG. 1, the first component region 16, here the vane element 12, is fully produced first, i.e. including the completed end of the vane element 12. Besides the end of the vane element 12, however, the planar surface 20 which is formed in this case, in order to construct the second component region 18 i.e. the honeycomb seals 14 thereon, already comprises a part of the honeycomb seals 14, which are produced from the first material like the vane segment 12. The rest of the second component region 18, i.e. here the honeycomb seals 14, is therefore constructed with the second material on the already existing part of the honeycomb seals 14.

Figure 3:
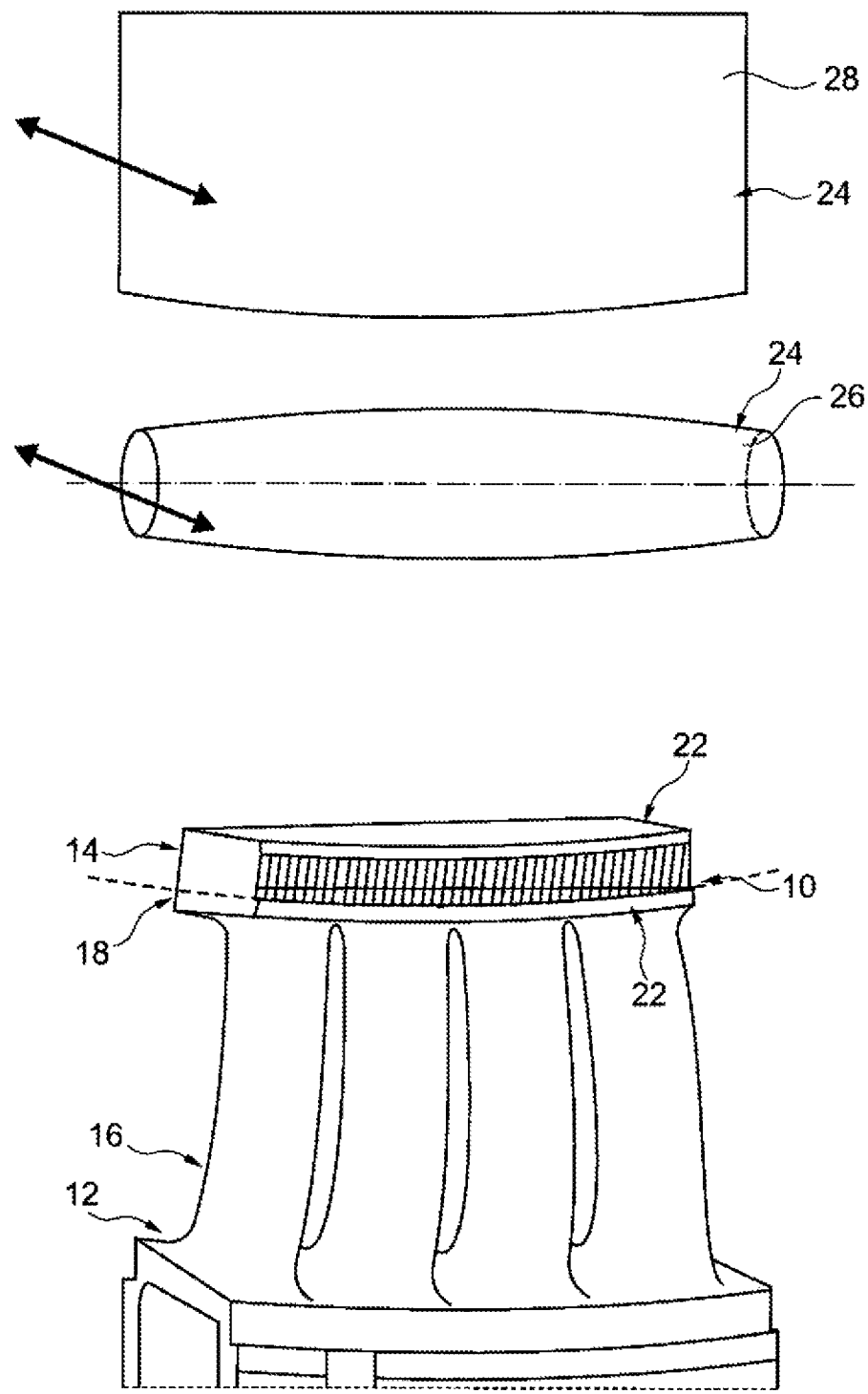
FIG. 3 shows a component according to one embodiment of the invention.

FIG. 3 in turn shows an example of a component 10 which is constructed by means of the invention. As the example of a component 10, the vane segment, which has a vane element 12 as a first component region 16 and honeycomb seals 14 as a second component region 18, is for example likewise selected here, the two component regions 16, 18 respectively being, for example, produced from different materials or material combinations.

According to the invention, only the first component region 16 is in this case produced first, i.e. only the vane segment 12, and it is produced fully with its end that has a non-planar surface 22, here for example a curved or arcuate end surface 22. In contrast to the component 10 in FIG. 1, the first component region 16 is in this case constructed fully, including the complete end. Furthermore, in contrast to FIG. 2, the first component region 16 does not comprise a part of the second component region 18, here the honeycomb seals 14.

This is now achieved in that, according to the invention, layer-wise application of powder on a non-planar surface is carried out, in contrast to FIGS. 1 and 2, in which the layer-wise application of powder is only ever carried out on a horizontal or planar surface and the component can only be constructed in horizontal or planar layers.

In a first embodiment, as shown in FIG. 3, a correspondingly shaped application unit 24 is used, which is adapted in terms of its shape or outer contour to a predetermined non-planar surface 22 of the component 10 to be produced, in order to apply powder onto the non-planar surface 22, in particular layer-wise. The application unit 24 may have a correspondingly shaped blade 26 and/or a correspondingly shaped scraper 28, to mention merely two examples among many for an application unit 24. FIG. 3 shows as application unit 24 a scraper 28 which is curved in accordance with the vane element 12 and the honeycomb seals 14, in order to apply powder onto the respectively correspondingly curved and therefore non-planar surface 22.

For this purpose, a support platform may furthermore be provided, as is shown in FIG. 4, onto which the powder to be solidified by means of energy radiation is applied layerwise in order to produce the component 10. The support platform is likewise formed with a curved or non-planar surface, onto which the powder is applied by the correspondingly shaped, here curved, application unit 24, for example a curved blade 26 or a curved scraper 28.

The application unit 24 shaped in accordance with a non-planar surface, which in this case is for example curved, here the curved scraper 28 or the curved blade 26, is moved in the direction of the arrow in the example shown in FIG. 3, here for example horizontally or in a straight line, over the support platform (not shown) or the respective component layer with the powder newly to be applied, so as to apply the respective next powder layer onto the support platform or the last component layer. The powder layer applied in this way is then solidified by means of an energy radiation source (not shown) in component regions, before the next powder layer is applied. The supplying of powder and the solidification of the powder by means of an energy radiation source are generally known. Likewise, determination of the component regions to be solidified, for example by scanning of the applied powder layer or by specification of component region data, is generally known and will not be described in detail here.

At the extremity of the first component region 16, a correspondingly curved or arcuate end can thus be achieved with a curved end surface 22 on which the second component region 18, i.e. here the honeycomb seals 14, can then be constructed for example from a different powder. The curved application unit 24 may likewise be used for this purpose. The component 10, which has for example a vane element 12 and honeycomb seals 14, may, as described above, for example have at least two component regions consisting of different materials or material combinations or it may be produced as a whole, or continuously, from one material or one material combination, depending on the function and intended use.

In the case in which, for example, the second component region 18, here the honeycomb seal 14, has a different shape, or non-planar surface or surfaces, here for example a different curvature, the curved application unit 24 which is adapted to the non-planar surface 22, here the curvature, of the first component region 16 may be formed so that it can be replaced with a different application unit. The application unit 24 can be replaced with a different correspondingly shaped application unit in this way. The different application unit is in this case shaped in accordance with the second component region 18, here for example formed with a curvature.

The use of such specially shaped application units 24 makes it possible to construct complex surfaces. Particularly for repair applications, this flexibility offers great advantages. If the application unit 24 is furthermore configured so that it can be replaced, different repair applications can be carried out in one machine or device. For example, vane segments in an engine having a honeycomb seal 14, as shown in FIG. 3, are an application of such a concept.

Figure 4A:
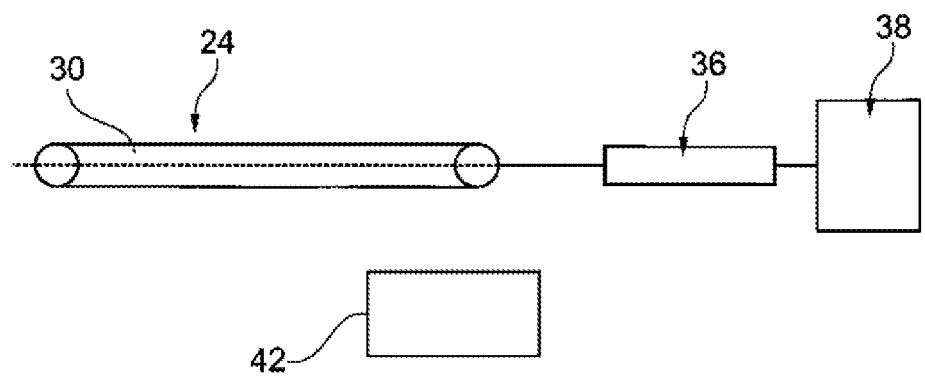
FIG. 4*a* shows an application unit for producing a component according to another embodiment of the invention.
Figure 4B:
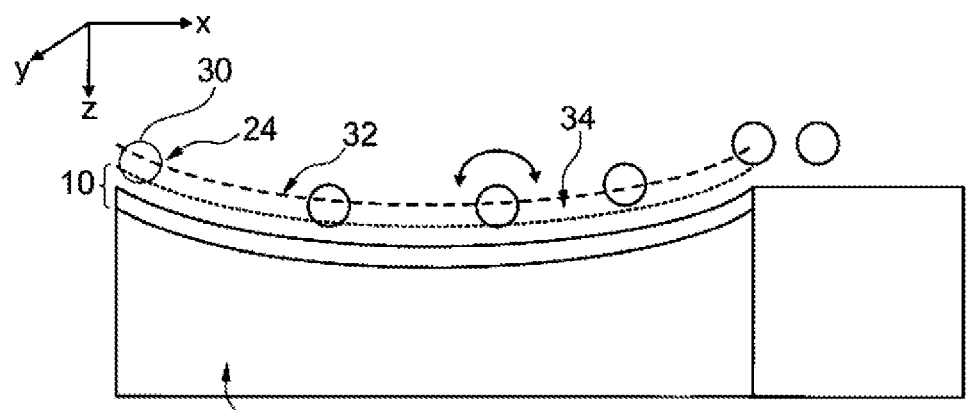
FIG. 4*b* shows a component according to another embodiment of the invention.

FIG. 4a in turn shows an application unit 24 for the production of a component 10 according to another embodiment of the invention. FIG. 4b shows the second embodiment of a component, which is constructed by means of the invention, in a greatly simplified and purely schematic way.

In the second embodiment according to the invention, the movement of the application unit 24 is now controlled in such a way that it applies the powder to be applied layer-wise on the non-planar surface 22. In the example shown in FIGS. 4*a* and 4*b*, the application unit 24 may therefore also be formed as a cylindrical roll 30 or cylindrical blade 30, or as a straight scraper (not shown) (see FIG. 4*a*). The roll or the blade 30 may in addition, if need be, also be formed so as to rotate about its longitudinal axis, as indicated in FIG. 4*b* by an arrow. This also applies for the embodiments in FIG. 3.

During the application of a respective powder layer onto the non-planar surface 22 or, as shown in FIG. 4*b*, for example a curved or arcuate surface, according to the invention the straight or, for example, cylindrical application unit 24 executes a movement along this surface 22 or the contour of this surface 22. The movement path 32 of the application unit 24 is represented in FIG. 4*b* by a dashed line and extends in accordance with the curved surface 22 onto which a powder layer 34 (indicated by a dotted line in FIG. 4*b*) is to be applied. In other words, the application unit 24 is moved in such a way that it follows the shape or contour of the surface 22, or moves parallel thereto or along it. This means that the application unit 24 is not moved in a straight line, or in a horizontal plane, as is possible for example in the embodiment of FIG. 3, but moves on a corresponding path 32, the profile of which corresponds to the non-planar or, here, curved surface 22 onto which a new powder layer 34 is intended to be applied.

For this purpose, the application unit 24 has a corresponding drive unit 36, which is connected to the application unit 24 in order to move the application unit 24. The drive unit 36 is furthermore connected to a control unit 38, which controls the drive unit 36 and therefore the movement of the application unit 24 in order to move the application unit 24 on a predetermined path 32, so that a powder layer 34 can also be applied onto a non-planar surface 22 or surfaces. In one embodiment of the invention, the application unit 24 is formed so that it can be replaced with a different application unit. In this case, the drive unit 36 may, for example, be formed so that it can be replaced together with or without the drive unit 36, depending on the function and intended use.

The application unit 24 may, as indicated in FIG. 4*b*, be formed so that it can be moved in at least two or all three directions in space, i.e. as shown in FIG. 4*b*, for example in the X direction and Z direction or in the X, Z and Y directions. The control unit 38 may, for example, have an NC controller for NC control of the movement or movement path 32 of the application unit 24. In addition, the application unit 24 may in principle also be specially shaped, as previously shown in FIG. 3, although it does not have to be. The application unit 24 does not need to have a special shape but, as described above, it may for example be formed as a cylindrical roll 30 or a cylindrical blade or a straight scraper, as previously. The roll or the blade 30 may optionally also be formed so as to rotate about the longitudinal axis, as indicated in FIG. 4*b* by an arrow.

As shown in the example in FIG. 4*b*, a non-planar support platform 40 may also be formed and used instead of a planar support platform, when, for example as previously shown in FIGS. 3 and 4*b*, the intention is to form a component 10 which has a non-planar surface 22, for example a curved contour, as its outer contour.

The powder layer 34 applied by means of the application unit 24 is subsequently solidified in the regions of the component 10 by means of energy radiation from an energy radiation source 42, for example by means of a laser beam and/or an electron beam, to mention only two examples.

The present invention is aimed in particular at the application field of generative manufacturing for the production of components. This includes so-called rapid manufacturing as well as so-called rapid prototyping. In generative manufacturing, components are constructed in particular layer-wise by material application. In this case, in the corresponding methods which are known as electron beam melting (EBM), LaserCusing, selective laser sintering (SLS), selective laser melting (SLM) and DMLS (direct metal laser sintering) or 3D printing, the material to be added or applied is processed in powder form. In particular, the powder is in this case applied layer-wise onto a support platform or a support. Subsequently, the powder layer is selectively solidified by means of energy radiation, for example by means of laser beams or electron beams.

The solidification of the respective powder layer is normally carried out on the basis of geometrical data of the component to be produced. In this case, the region of the powder layer may, for example, be scanned and the section belonging to the corresponding component layer may be solidified by means of energy radiation. Under the effect of the energy radiation, the powder is melted or sintered in this region. In the case of 3D printing, the powder layer is solidified by introducing a binder selectively into the regions belonging to the component. Subsequently, a next powder layer is provided and in turn solidified. In this way, the component, for example an aircraft component such as a vane element or a part of a vane element, can be constructed or supplemented layer-by-layer, for example in the case of repair.

In this case, as previously described with reference to FIGS. 3, 4*a* and 4*b*, a correspondingly shaped application unit 24 may be used in order to apply the powder and/or the movement of the application unit 24 may be controlled in accordance with the surface 22 to be coated.

The powder may be composed of one or more materials, and the powder may for example comprise at least one metal powder, metal alloy powder, ceramic powder and/or plastic powder, to mention only a few examples for the powder. In principle, it is possible to use any powder of a material or material combination which is suitable for being solidified by means of an energy radiation source, for example an electron beam or a laser beam. In principle, it is possible to use any other energy radiation source which is suitable for solidifying an associated powder.

By means of the invention, as described with reference to FIGS. 3, 4*a* and 4*b*, components 10 having complex geometries can also be produced, constructed or supplemented and/or repaired. In the embodiments of the invention, the application unit 24 may also optionally be provided as replaceable, in order to be able to use differently shaped application units.

As the component 10, in particular an aircraft component, for example a vane element, may in this way be produced, repaired or replaced. It is, however, also possible to provide all other types of components which are produced by means of a powder that is to be solidified by energy radiation.

Figure 5:
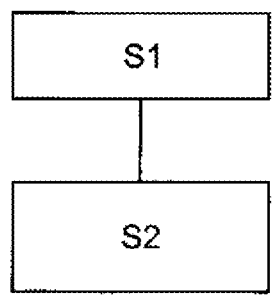
FIG. 5 shows a diagram to represent the method for producing, repairing and/or replacing a component, according to the invention.

FIG. 5 shows a flowchart of the production, repair and/or replacement of a component, according to the invention.

In this case, an application unit is provided, which is formed in order to apply a powder to be solidified by means of energy radiation onto a non-planar surface. For this purpose, the application unit is adapted to the contour or the contour profile of the non-planar surface and/or it is moved on a path along the contour of the non-planar surface. In the latter case, the application unit may also have a shape which is not adapted to the contour or the contour profile of the non-planar surface, since this can be compensated for or balanced by the movement of the application unit. This means that the application unit is formed as a straight or cylindrical blade, roll or scraper.

The non-planar surface, onto which the powder can be applied by means of the application unit, may for example be the non-planar surface of a support platform. The non-planar surface of the support platform may in particular be adapted to a contour or outer contour of a component to be produced, or correspond thereto, as indicated in FIG. 4. Likewise, however, the non-planar surface may also be part of a component to be repaired or of a component region, in which a component element is intended to be replaced.

After application of the respective powder layer by means of the application unit (step S1), the powder can be solidified by means of an energy radiation source in the component regions to be solidified (step S2), for example by means of laser radiation or electron radiation, as described above. In the case of differently non-planar surfaces, the replaceably formed application unit may be replaced.

Although the present invention has been described above with the aid of the preferred exemplary embodiments, it is not restricted thereto but may be modified in a variety of ways. In particular, the exemplary embodiments described above, and in particular individual features thereof, may be combined with one another.

What is claimed is:

1. A device which is suitable for producing and/or repairing a component by means of a powder that is capable of being solidified by energy radiation from an energy radiation source, wherein the device comprises an application unit which is configured so that it is capable of applying powder to be solidified onto a curved or arcuate surface in the form of at least one curved or arcuate powder layer which can subsequently be solidified by the energy radiation from the energy radiation source.

2. The device of claim 1, wherein the application unit is configured so that it is moveable on a path along a contour or a contour profile of the curved or arcuate surface.

3. The device of claim 1, wherein the application unit is present as a cylindrical blade.

4. The device of claim 1, wherein the application unit is present as a cylindrical roll.

5. The device of claim 1, wherein the application unit is present as a scraper with a straight or planar shape.

6. The device of claim 1, wherein the application unit is present as a curved scraper or a curved blade.

7. The device of claim 1, wherein a shape of the application unit is adapted to a contour or a contour profile of the curved or arcuate surface to apply a powder layer onto the curved or arcuate surface.

8. The device of claim 1, wherein the application unit is configured so as to be replaceable.

9. The device of claim 1, wherein the application unit is connected to a drive unit for moving the application unit.

10. The device of claim 9, wherein the drive unit is connected to a control unit, the control unit controlling the drive unit and the application unit connected thereto as a function of a predetermined path profile.

11. The device of claim 10, wherein the control unit comprises an NC controller.

12. The device of claim 9, wherein the application unit is movable by the drive unit in two directions in space.

13. The device of claim 9, wherein the application unit is movable by the drive unit in all three directions in space.

14. The device of claim 1, wherein the device further comprises a support platform, the support platform having a curved or arcuate surface which is adapted to a curved or arcuate contour or outer contour of a component.

15. The device of claim 1, wherein the device further comprises an energy radiation source which is positioned so as to be capable of solidifying the at least one curved or arcuate powder layer present on the curved or arcuate surface.

16. The device of claim 15, wherein the energy radiation source comprises a laser beam.

17. The device of claim 15, wherein the energy radiation source comprises an electron beam.

18. The device of claim 1, wherein the curved or arcuate surface is a concave surface.

19. The device of claim 1, wherein the curved or arcuate surface is a convex surface.

20. A device which is suitable for producing and/or repairing a component by means of a powder that is capable of being solidified by energy radiation from an energy radiation source, wherein the device comprises an application unit which is configured so that it is capable of applying powder to be solidified onto a non-moving curved or arcuate surface in the form of at least one curved or arcuate powder layer which can subsequently be solidified by the energy radiation from an energy radiation source, and wherein the application unit is configured so that it is moveable on a path along a contour or a contour profile of the curved or arcuate surface and is movable in one, two or three directions in space by being connected to a drive unit.

* * * * *